(12) United States Patent
Chai et al.

(10) Patent No.: US 9,845,370 B2
(45) Date of Patent: Dec. 19, 2017

(54) METHOD OF PREPARING HEAT-RESISTANT RESIN, HEAT-RESISTANT RESIN AND HEAT-RESISTANT ABS RESIN COMPOSITION

(71) Applicant: LG CHEM, LTD., Seoul (KR)

(72) Inventors: Joo Byung Chai, Daejeon (KR); Eun Seon Park, Daejeon (KR); Tae Young Jeon, Daejeon (KR); Young Min Kim, Daejeon (KR); Jong Beom Kim, Daejeon (KR); Chang Sull Kim, Daejeon (KR); Yu Sung Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 38 days.

(21) Appl. No.: 15/022,550

(22) PCT Filed: Oct. 6, 2015

(86) PCT No.: PCT/KR2015/010529
§ 371 (c)(1),
(2) Date: Mar. 16, 2016

(87) PCT Pub. No.: WO2016/056810
PCT Pub. Date: Apr. 14, 2016

(65) Prior Publication Data
US 2016/0297909 A1 Oct. 13, 2016

(30) Foreign Application Priority Data

Oct. 7, 2014 (KR) .................. 10-2014-0134717
Oct. 2, 2015 (KR) .................. 10-2015-0138837

(51) Int. Cl.
| | | |
|---|---|---|
| C08L 51/04 | (2006.01) |
| C08L 25/12 | (2006.01) |
| C08F 212/10 | (2006.01) |
| C08F 2/22 | (2006.01) |
| C08F 2/38 | (2006.01) |
| C08F 2/44 | (2006.01) |
| C08F 265/08 | (2006.01) |
| C08F 279/04 | (2006.01) |
| C08F 212/12 | (2006.01) |
| C08L 51/06 | (2006.01) |

(52) U.S. Cl.
CPC .............. *C08F 212/10* (2013.01); *C08F 2/22* (2013.01); *C08F 2/38* (2013.01); *C08F 2/44* (2013.01); *C08F 212/12* (2013.01); *C08F 265/08* (2013.01); *C08F 279/04* (2013.01); *C08L 25/12* (2013.01); *C08L 51/06* (2013.01)

(58) Field of Classification Search
CPC ........ C08L 25/12; C08L 55/02; C08L 51/003; C08F 212/10; C08F 279/04
See application file for complete search history.

(56) References Cited

U.S. PATENT DOCUMENTS 4,920,178 A   4/1990   Zabrocki et al.
4,972,032 A   11/1990  Henton et al.

FOREIGN PATENT DOCUMENTS

| KR | 10-0131573 B1 | 4/1998 |
| KR | 10-2009-0052364 A | 5/2009 |
| KR | 10-2010-0062418 A | 6/2010 |
| KR | 10-2013-0090307 A | 8/2013 |

*Primary Examiner* — Jeffrey C Mullis

(57) ABSTRACT

The present invention relates to a method of preparing a heat-resistant resin, a heat-resistant resin, and a heat-resistant ABS resin. According to the preparation method of the present invention, the heat-resistant resin can be prepared at a high polymerization conversion rate within a shortened polymerization time, and the amount of polymerized coagulum and the content of fine particles upon coagulation are decreased. Accordingly, a heat-resistant resin and a heat-resistant ABS resin composition with enhanced heat deflection temperature and processability are provided.

17 Claims, No Drawings

METHOD OF PREPARING HEAT-RESISTANT RESIN, HEAT-RESISTANT RESIN AND HEAT-RESISTANT ABS RESIN COMPOSITION

CROSS-REFERENCE TO RELATED APPLICATIONS

This application is a U.S. National Stage of International Patent Application No. PCT/KR2015/010529, filed Oct. 6, 2015, which claims the benefit of Korean Patent Application No. 10-2014-0134717 filed on 7 Oct. 2014 and Korean Patent Application No. 10-2015-0138837 filed on 2 Oct. 2015 with the Korean Intellectual Property Office, the disclosures of which are incorporated herein by reference in their entirety.

TECHNICAL FIELD

The present invention relates to a method of preparing a heat-resistant resin, a heat-resistant resin prepared thereby and a heat-resistant ABS resin composition. More particularly, the present invention relates to a preparation method to prepare a heat-resistant resin in a high polymerization conversion rate within a shortened polymerization time and to decrease the amount of polymerized coagulum and the content of fine particles upon coagulation, and a heat-resistant resin and a heat-resistant ABS resin composition with enhanced heat deflection temperature and processability prepared according to the method.

BACKGROUND ART

In general, emulsion-polymerized heat-resistant SANs have advantages such as high Tg and high molecular weight, but disadvantages such as decreased workability and productivity due to long polymerization time, high temperature during coagulation/drying processes, and a pressing process.

Accordingly, methods such as a method of enhancing polymerization speed by increasing the amounts of an emulsifier and an initiator and a method of enhancing cohesion through addition of an organic solvent, etc. have been attempted. However, by increasing the amounts of an emulsifier and an initiator, impurities derived from these additives and a generated oligomer amount are increased, whereby a decrement of Tg increases. In addition, cohesion enhancement due to addition of an organic solvent may cause workability decrease due to volatilization of the organic solvent and intrinsic heat-resistant characteristics may be deteriorated by Tg decrease due to a remaining organic solvent.

Therefore, there is an urgent need for technology to maintain intrinsic heat resistance while securing a polymerization rate and cohesion.

RELATED DOCUMENTS

Patent Documents (Patent Document 1) U.S. Pat. No. 4,340,723 A
(Patent Document 2) U.S. Pat. No. 5,171,814 A

DISCLOSURE

Technical Problem

Therefore, the present invention has been made in view of the above problems. Inventors of the present invention developed technology for preparing a heat-resistant resin at a high polymerization conversion rate within a shortened polymerization time and decreasing the amount of polymerized coagulum and the content of fine particles upon coagulation, thus completing the present invention.

It is one object of the present invention to provide a method of preparing a heat-resistant resin, by which a polymerization rate and cohesion are secured, a heat resistant resin prepared according to the method, and a heat-resistant ABS resin composition including the heat resistant resin and having enhanced heat deflection temperature and processability.

Technical Solution

In accordance with one aspect of the present invention, provided is a method of preparing a heat-resistant resin, the method including: polymerizing a heat-resistant compound-vinylcyan compound-based seed comprising 70 to 80 parts by weight of a heat-resistant compound monomer and 30 to 20 parts by weight of a vinylcyan compound monomer and having a glass transition temperature of 140° C. or more, an average particle diameter of 300 to 700 Å, and a weight-average molecular weight of 200,000 to 300,000 g/mol; and polymerizing a heat-resistant compound-vinylcyan compound-based shell enveloping the seed, the heat-resistant compound-vinylcyan compound-based shell comprising 30 to 80 parts by weight of the seed and 70 to 20 parts by weight of a heat-resistant compound monomer and vinylcyan compound monomer, and having a glass transition temperature of 135 to 145° C. and a weight-average molecular weight of 100,000 to 150,000 g/mol.

In accordance with another aspect of the present invention, provided is a heat-resistant SAN resin having a structure formed of a heat-resistant compound-vinylcyan compound seed and a heat-resistant compound-vinylcyan compound shell enveloping the seed, a weight-average molecular weight (Mw) of 100,000 to 150,000 g/mol, and a glass transition temperature (Tg) of 135 to 145° C.

In accordance with yet another aspect of the present invention, provided is a heat-resistant ABS resin composition including the aforementioned heat-resistant SAN resin and having a heat deflection temperature (HDT) of greater than 100° C. and a melt index (MI) of 3.5 to 4.0.

Advantageous Effects

As apparent from the fore-going, a heat-resistant resin can be prepared at a high polymerization conversion rate within a shortened polymerization time, and the amount of polymerized coagulum and the content of fine particles upon coagulation are decreased. Accordingly, a heat-resistant resin and a heat-resistant ABS resin composition with enhanced heat deflection temperature and processability are provided.

BEST MODE

Now, the present invention will be described in more detail.

In an embodiment, a method of preparing a heat-resistant resin of the present invention may include the following steps:

(a) a step of polymerizing a heat-resistant compound-vinylcyan compound-based seed comprising 70 to 80 parts by weight of a heat-resistant compound monomer and 30 to 20 parts by weight of a vinylcyan compound monomer and having a glass transition temperature of 140° C. or more, an average particle diameter of 300 to 700 Å, and a weight-average molecular weight of 200,000 to 300,000 g/mol; and (b) a step of polymerizing a heat-resistant compound-vinylcyan compound-based shell enveloping the seed, the heat-resistant compound-vinylcyan compound-based shell comprising 30 to 80 parts by weight of the seed and 70 to 20 parts by weight of a heat-resistant compound monomer and vinylcyan compound monomer, and having a glass transition temperature of 135 to 145° C. and a weight-average molecular weight of 100,000 to 150,000 g/mol.

In another embodiment, a method of preparing the heat-resistant resin of the present invention may include the following steps:

(a) a step of polymerizing a heat-resistant compound-vinylcyan compound-based seed comprising 75 to 80 parts by weight of a heat-resistant compound monomer and 25 to 20 parts by weight of a vinylcyan compound monomer and having a glass transition temperature of 140 to 142° C., an average particle diameter of 350 to 450 Å, and a weight-average molecular weight of 250,000 to 300,000 g/mol; and (b) a step of polymerizing a heat-resistant compound-vinylcyan compound-based shell enveloping the seed, the heat-resistant compound-vinylcyan compound-based shell comprising 30 to 80 parts by weight of the seed and 70 to 20 parts by weight of a heat-resistant compound monomer and vinylcyan compound monomer, and having a glass transition temperature of 137 to 142° C. and a weight-average molecular weight of 120,000 to 140,000 g/mol.

The heat-resistant compound of steps (a) and (b) may be, for example, α-methylstyrene. In this case, superior heat-resistance and property balance are exhibited.

The vinylcyan compound of steps (a) and (b) may be, for example, at least one selected from the group consisting of acrylonitrile, methacrylonitrile, and ethacrylonitrile. In this case, superior heat-resistant and mechanical properties are exhibited.

In particular, step (a) has a technical characteristic in that a lowest glass transition temperature suggested to counteract a decrement of glass transition temperature (Tg) due to formation of molecules with low molecular weights is satisfied.

In step (a), when the weight-average molecular weight (Mw) is less than 200,000 g/mol, the glass transition temperature may be decreased. When the weight-average molecular weight (Mw) is greater than 300,000 g/mol, moldability of a final polymer in which the prepared seed is used may be decreased.

In step (a), when the average particle diameter is less than 300 Å, the amount of an emulsifier used to prepare a corresponding polymer is excessively increased, whereby the glass transition temperature of a final product may be decreased. When the average particle diameter is greater than 700 Å, polymerization rate increase upon polymerization of the shell in the subsequent step (b) might not be achieved.

In step (a), when the glass transition temperature is less than 140° C., the glass transition temperatures of a total of the resins may be rapidly decreased after polymerization of the shell in the subsequent step (b).

A total polymerization time of steps (a) and (b) may be, for example, four hours or less, three to four hours, or three hours. In addition, a polymerization conversion rate in each of steps (a) and (b) may be, for example, 98.5% or more, 99.0% or more, or 99.0 to 99.5%. Within this range, the content of a monomer remainder is decreased, thus providing superior heat resistance.

As an embodiment, in 20 to 30 parts by weight of the vinylcyan compound monomer of step (a), at least one selected from (meth)acrylic acid alkyl ester monomer and aromatic vinyl compound monomer (except for α-methylstyrene), a (meth)acrylic acid alkyl ester monomer, or an aromatic vinyl compound monomer (except for α-methylstyrene) may be included in an amount of 2 to 5 parts by weight or 3 to 5 parts by weight.

The (meth)acrylic acid alkyl ester may be, for example, at least one selected from the group consisting of (meth)acrylic acid methyl ester, (meth)acrylic acid ethyl ester, (meth)acrylic acid propyl ester, (meth)acrylic acid 2-ethylhexyl ester, (meth)acrylic acid decyl ester and (meth)acrylic acid lauryl ester. In this case, superior mechanical properties and property balance are exhibited.

The aromatic vinyl compound may be at least one selected from the group consisting of styrene, p-methylstyrene, o-methylstyrene, p-ethylstyrene, and vinyltoluene. In this case superior mechanical properties and property balance are exhibited.

In an embodiment, step (a) may include (a-1) a step of emulsion-polymerizing by feeding 70 to 80 parts by weight of the heat-resistant compound monomer batchwise, 8 to 10 parts by weight of the vinylcyan compound monomer, and 0 to 2 parts by weight of at least one selected from a (meth)acrylic acid alkyl ester monomer and an aromatic vinyl compound monomer (except for α-methylstyrene), in the presence of a $C_{12}$ to $C_{18}$ saturated hydrocarbon-based emulsifier; (a-2) a step of emulsion-polymerizing by continuously feeding 5 to 15 parts by weight of the vinylcyan compound monomer in the presence of the $C_{12}$ to $C_{18}$ saturated hydrocarbon-based emulsifier when a polymerization conversion rate is 83 to 88%; and (a-3) a step of polymerizing by feeding 2 to 8 parts by weight of the vinylcyan compound monomer batchwise when a polymerization conversion rate is 92 to 96%.

In another embodiment, step (a) may include (a-1) a step of emulsion-polymerizing by feeding 72 to 78 parts by weight of the heat-resistant compound monomer batchwise, 8 to 10 parts by weight of the vinylcyan compound monomer, and 0 to 2 parts by weight of at least one selected from a (meth)acrylic acid alkyl ester monomer and an aromatic vinyl compound monomer (except for α-methylstyrene), in the presence of a $C_{12}$ to $C_{18}$ saturated hydrocarbon-based emulsifier; (a-2) a step of emulsion-polymerizing by continuously feeding 7 to 12 parts by weight of the vinylcyan compound monomer in a presence of the $C_{12}$ to $C_{18}$ saturated hydrocarbon-based emulsifier when a polymerization conversion rate is 84 to 86%; and (a-3) a step of polymerizing by feeding 3 to 6 parts by weight of the vinylcyan compound monomer batchwise when a polymerization conversion rate is 93 to 95%.

The at least one selected from the (meth)acrylic acid alkyl ester monomer and the aromatic vinyl compound monomer (except for α-methylstyrene) may be included in an amount of, for example, 0.1 to 2 parts by weight.

In step (a-1), the $C_{12}$ to $C_{18}$ saturated hydrocarbon-based emulsifier may be, for example, an alkali salt of lauric acid, an alkali salt of stearic acid, an alkali salt of palmitic acid, etc.

The $C_{12}$ to $C_{18}$ saturated hydrocarbon-based emulsifier may be included in an amount of 1.4 to 2.9 parts by weight, or 2.0 to 2.9 parts by weight in step (a-1) based on 100 parts by weight of a total of the monomers of step (a). A total amount of the $C_{12}$ to $C_{18}$ saturated hydrocarbon-based emulsifier of step (a-2) and the emulsifier of step (a-1) may be 2.1 to 4.0 parts by weight, or 2.1 to 3.5 parts by weight. Within this range, the average particle diameter, weight-average molecular weight (Mw), and glass transition temperature (Tg) of the seed prepared in step (a) may be properly controlled.

In step (a-1), as needed, a mercaptan-based molecular weight controller and an initiator may be applied together. The mercaptan-based molecular weight controller may be included in an amount of 0.1 to 0.2 parts by weight based on 100 parts by weight of a total of the monomers of step (a).

As the initiator, a water-soluble initiator such as potassium persulfate or a lipid-soluble peroxide initiator may be used along with an oxidation-reduction catalyst. So as to perform polymerization at 70° C. or less in an initial reaction step, the lipid-soluble peroxide initiator is preferred.

The oxidation-reduction catalyst may be, for example, dextrose, sodium pyrophosphate, ferrous sulfate, etc. In a specific embodiment, 0.025 to 0.035 parts by weight of dextrose, 0.05 to 0.06 parts by weight of sodium pyrophosphate, and 0.005 to 0.0015 parts by weight of ferrous sulfate may be included based on 100 parts by weight of a total of the monomers of step (a).

In an embodiment, step (a) may be carried out at 30 to 80° C. In a specific embodiment, step (a-1) may be carried out at 50 to 70° C., and steps (a-2) and (a-3) may be respectively carried out at 70 to 80° C.

In step (b), the heat-resistant compound monomer may be included, for example, in an amount of 5 to 60 parts by weight, or 10 to 55 parts by weight based on 100 parts by weight of the seed composing the shell and a total of the monomers.

In step (b), the vinylcyan compound monomer may be included, for example, in an amount of 5 to 20 parts by weight, or 10 to 15 parts by weight based on 100 parts by weight of the seed composing the shell and a total of the monomers.

In another embodiment, in 5 to 20 parts by weight of the vinylcyan compound monomer of step (b), at least one selected from a (meth)acrylic acid alkyl ester monomer and an aromatic vinyl compound monomer (except for α-methylstyrene), a (meth)acrylic acid alkyl ester monomer, or an aromatic vinyl compound monomer (except for α-methylstyrene) may be included in an amount of 1 to 5 parts by weight or 2 to 4 parts by weight.

The (meth)acrylic acid alkyl ester may be, for example, at least one selected from the group consisting of (meth)acrylic acid methyl ester, (meth)acrylic acid ethyl ester, (meth)acrylic acid propyl ester, (meth)acrylic acid 2-ethylhexyl ester, (meth)acrylic acid decyl ester, and (meth)acrylic acid lauryl ester. In this case superior mechanical properties and property balance are exhibited.

The aromatic vinyl compound may be, for example, at least one selected from the group consisting of styrene, p-methylstyrene, o-methylstyrene, p-ethylstyrene, and vinyltoluene. In this case superior mechanical properties and property balance are exhibited.

In a specific embodiment, step (b) may include (b-1) emulsion-polymerizing by feeding 30 to 80 parts by weight of the seed, 7 to 45 parts by weight of the heat-resistant compound monomer, 3 to 10 parts by weight of the vinylcyan compound monomer, and 0 to 2 parts by weight of at least one selected from a (meth)acrylic acid alkyl ester and an aromatic vinyl compound (except for α-methylstyrene) to a mixture that comprises an emulsifier mixture comprising a $C_{12}$ to $C_{18}$ saturated hydrocarbon-based emulsifier and a monomer-type or polymer-type emulsifier with an unsaturated double bond, and a molecular weight controller mixture comprising a mercaptan-based $C_6$ to $C_{12}$ molecular weight controller and a dimer-based molecular weight controller; (b-2) emulsion-polymerizing by continuously feeding 3 to 10 parts by weight of the heat-resistant compound monomer and 3 to 5 parts by weight of the vinylcyan compound monomer in the presence of a $C_{12}$ to $C_{18}$ saturated hydrocarbon-based emulsifier when a polymerization conversion rate is 83 to 88%; and (b-3) polymerizing by adding 1 to 5 parts by weight of the vinylcyan compound monomer batchwise when a polymerization conversion rate is 92 to 96%.

In another embodiment, step (b) may include (b-1) emulsion-polymerizing by feeding 30 to 80 parts by weight of the seed, 7 to 45 parts by weight of the heat-resistant compound monomer, 3 to 10 parts by weight of the vinylcyan compound monomer, and 0 to 2 parts by weight of at least one selected from a (meth)acrylic acid alkyl ester and an aromatic vinyl compound (except for α-methylstyrene) to a mixture that comprises an emulsifier mixture comprising a $C_{12}$ to $C_{18}$ saturated hydrocarbon-based emulsifier and a monomer-type or polymer-type emulsifier with an unsaturated double bond, and a molecular weight controller mixture comprising a mercaptan-based $C_6$ to $C_{12}$ molecular weight controller and a dimer-based molecular weight controller; (b-2) emulsion-polymerizing by continuously feeding 3 to 10 parts by weight of the heat-resistant compound monomer and 3 to 5 parts by weight of the vinylcyan compound monomer in the presence of a $C_{12}$ to $C_{18}$ saturated hydrocarbon-based emulsifier when a polymerization conversion rate is 84 to 86%; and (b-3) polymerizing by adding 1 to 5 parts by weight of the vinylcyan compound monomer batchwise when a polymerization conversion rate is 93 to 95%.

The at least one selected from the (meth)acrylic acid alkyl ester monomer and the aromatic vinyl compound monomer (except for α-methylstyrene) may be included, for example, in an amount of 0.1 to 2 parts by weight.

In step (b-1), the mercaptan-based $C_6$ to $C_{12}$ molecular weight controller and the dimer-based molecular weight controller may be mixed in a ratio of 50:50 to 90:10 or 60:40 to 90:10 and comprised in an amount of 0.2 to 0.5 parts by weight or 0.2 to 0.4 parts by weight based on 100 parts by weight of the seed composing the shell and a total of the monomers. Within this range, polymerization conversion rate, the amount of coagulum, reaction time, glass transition temperature, weight-average molecular weight, etc. may be properly controlled.

The dimer-based molecular weight controller indicates an α-methylstyrene dimer such as ASMD-α-methylstyrene, unless otherwise specified.

The molecular weight controller may be applied, for example, along with an initiator. As the initiator, a water-soluble initiator such as potassium persulfate or a lipid-soluble peroxide initiator may be used along with an oxidation-reduction catalyst. So as to perform polymerization at 70° C. or less in an initial reaction step, the lipid-soluble peroxide initiator is preferred.

The oxidation-reduction catalyst may be, for example, sodium pyrophosphate, ferrous sulfate, etc. In a specific embodiment, 0.035 parts by weight of dextrose, 0.06 parts by weight of sodium pyrophosphate, and 0.0015 parts by weight of ferrous sulfate may be included.

The $C_{12}$ to $C_{18}$ saturated hydrocarbon-based emulsifier and the low molecular weight emulsifier may be mixed with an unsaturated double bond, for example, in a weight ratio of 50:50 to 90:10 or 60:40 to 90:10 and included in an amount of 0.5 to 1.0 parts by weight or 0.6 to 0.9 parts by weight based on 100 parts by weight of the seed composing the shell and a total of the monomers of step (b).

The low-molecular-weight emulsifier with an unsaturated double bond may be a monomolecular emulsifier with an unsaturated double bond which is copolymerizable with a monomer. For example, an anionic emulsifier having an allyl group, an alkenyl group, or a propenyl group or a neutral emulsifier may be used. In particular, examples of the anionic emulsifier having the allyl group include sulfate salts of polyoxyethylene allyl glycidyl nonylphenyl ether, etc., examples of the anionic emulsifier having the alkenyl group include alkenyl succinate, examples of the neutral emulsifier having the allyl group include ethers such as polyoxyethylene allyl glycidyl nonylphenyl, and examples of the anionic emulsifier having the propenyl group include an ammonium sulfate of polyoxyethylene nonylpropenyl phenylether.

In step (b-2), the $C_{12}$ to $C_{18}$ saturated hydrocarbon-based emulsifier may be included in an amount of, for example, 0.2 to 0.5 parts by weight, or 0.2 to 0.4 parts by weight based on 100 parts by weight of the seed composing the shell and a total of the monomers of step (b).

Step (b) may be carried out at 30 to 80° C. In a specific embodiment, step (b-1) may be carried out at 50 to 70° C., and steps (b-2) and (b-3) may be respectively carried out at 70 to 80° C.

The amount of a coagulum formed by the polymerization of step (b) may be, for example, 0.03% by weight or less, 0.018% by weight or less, or 0.012 to 0.018% by weight.

In addition, the polymerized product may be coagulated within a generally used temperature range. In a specific embodiment, the polymerized product may be coagulated at 100 to 130° C., or 100 to 120° C.

A coagulant used in the coagulation may be, for example, an acidic coagulant such as sulfuric acid, phosphoric acid, or hydrochloric acid, a salt coagulant such as magnesium sulfate or calcium chloride, or a mixture thereof. In an embodiment, the coagulant may be used in an amount of 0.1 to 5 parts by weight based on 100 parts by weight of total solids.

Since the method of preparing the heat-resistant resin is composed of the aforementioned two polymerization steps, and polymerization reaction time is shortened, polymerization stability is accomplished. At the same time, when a polymer is coagulated using the method, coagulation can be effectively carried out without property decrease of the heat-resistant ABS.

A heat-resistant SAN resin obtained according to the aforementioned method of the present invention may have a structure composed of the heat-resistant compound-vinylcyan compound seed and the heat-resistant compound-vinylcyan compound shell enveloping the seed, a weight-average molecular weight of 100,000 to 150,000 g/mol or 120,000 to 140,000 g/mol, and a glass transition temperature of 135 to 145° C. or 137 to 142° C.

In addition, the present invention may provide a heat-resistant ABS resin composition including the aforementioned heat-resistant SAN resin and ABS resin and having a heat deflection temperature (HDT) of greater than 100° C., or 105 to 108° C., and a melt index (MI) of 3.5 to 4.0.

The SAN resin may be included in an amount of, for example, 50 to 80 parts by weight, or 60 to 80 parts by weight. The ABS resin may be included in an amount of 50 to 20 parts by weight, or 40 to 20 parts by weight.

The ABS resin may be a dry powder including 30 to 80% by weight or 40 to 70% by weight of rubber.

In addition, the ABS resin composition may include, as needed, additives such as a lubricant and a thermal stabilizer in a range within which properties of the composition are not affected.

Now, the present invention will be described in more detail with reference to the following examples. These examples are provided for illustrative purposes only and should not be construed as limiting the scope and spirit of the present invention and are obvious to those of ordinary skill in the art to which the present invention pertains. In addition, those of ordinary skill in the art may carry out a variety of applications and modifications based on the foregoing teachings within the scope of the present invention, and these modified embodiments may also be within the scope of the appended claims.

EXAMPLES

Examples 1 to 3 and Comparative Examples 1 to 4

(a) Seed Polymerization Step 1 (S1 Preparation)

In a nitrogen-substituted reactor, 150 parts by weight of deionized water, 75 parts by weight of α-methylstyrene, and 10 parts by weight of acrylonitrile were mixed with 2.5 parts by weight of lauric acid potassium at 50° C. for 30 minutes. Subsequently, an oxidation-reduction catalyst composed of 0.02 parts by weight of t-butyl hydroperoxide, 0.035 parts by weight of dextrose, 0.06 parts by weight of sodium pyrophosphate, and 0.0015 parts by weight of ferrous sulfate was fed thereto batchwise, followed by performing polymerization while elevating temperature to 70° C. over one hour. Here, a polymerization conversion rate was about 85%.

Subsequently, an emulsion composed of 100 parts by weight of deionized water, 10 parts by weight of acrylonitrile, and 1.0 parts by weight of lauric acid potassium was continuously added together while elevating temperature up to 75° C. over one and half hours. Here, a polymerization conversion rate was about 94%.

Next, 5 parts by weight of acrylonitrile along with an oxidation-reduction catalyst composed of 0.03 parts by weight of t-butylhydroperoxide, 0.035 parts by weight of dextrose, 0.06 parts by weight of sodium pyrophosphate, and 0.0015 parts by weight of ferrous sulfate was fed batchwise and additional polymerization was carried out for one hour.

A polymerization conversion rate of a final product was about 99.5%, and an average particle diameter thereof was about 350 Å. An obtained latex was dried at 160° C. for 30 minutes, and the dried sample exhibited a glass transition temperature of 142° C. and a weight-average molecular weight of about 250,000 g/mol.

For reference, so as to measure the polymerization conversion rate, 1.5 g of the prepared latex was dried in a 150° C. hot air drier and then the weight thereof was measured to find a total solid content (TSC). The polymerization conversion rate was calculated according to Equation 1 below, and the average particle diameter was measured by means of a light scattering type detector (Nicomp) after diluting 1 g of the prepared latex with distilled water. An average particle diameter confirmed through the detector was recorded.

[Equation 1]
$$\text{POLYMERIZATION CONVERSION RATE (\%)} = \frac{\begin{pmatrix}\text{PARTS BY WEIGHT OF FED MONOMERS} \\ \text{AND SUPPLEMENTARY MATERIALS}\end{pmatrix} - \begin{pmatrix}\text{PARTS BY WEIGHT OF} \\ \text{SUPPLEMENTARY MATERIALS}\end{pmatrix}}{\text{TOTAL SOLID CONTENT } (TSC)} \times 100$$

(a) Seed Polymerization Step 2 (S2 Preparation)

An experiment was carried out in the same manner as in (a) seed polymerization step 1 (S1 preparation), except that 75 parts by weight of α-methylstyrene, 8 parts by weight of acrylonitrile, and 2 parts by weight of methyl methacrylate along with 2.0 parts by weight of lauric acid potassium, as monomers fed batchwise in an initial reaction step, were fed together and polymerization was carried out. Properties of a corresponding latex are summarized in Table 1.

(a) Seed Polymerization Step 3 (S3 Preparation)

An experiment was carried out in the same manner as in (a) seed polymerization step 2 (S2 preparation), except that 75 parts by weight of α-methylstyrene, 8 parts by weight of acrylonitrile, and 2 parts by weight of methyl methacrylate along with 1.5 parts by weight of lauric acid potassium, as monomers fed batchwise in an initial reaction step, were fed together and polymerized, and the content of the lauric acid potassium fed upon continuous feeding of the emulsion was 0.5 parts by weight. Properties of a corresponding latex are summarized in Table 1.

(a) Seed Polymerization Step 4 (S4 Preparation)

An experiment was carried out in the same manner as in (a) seed polymerization step 1 (S1 preparation), except that the lauric acid potassium fed batchwise in an initial reaction step was fed in an amount of 3.5 parts by weight and polymerized, a polymerization conversion rate was 85%, and the content of the lauric acid potassium fed upon continuous feeding of the emulsion was 1.5 parts by weight. Properties of a corresponding latex are summarized in Table 1.

TABLE 1

| Classification | | S1 | S2 | S3 | S4 |
|---|---|---|---|---|---|
| Step (a-1) (feeding batchwise) | α-methylstyrene (% by weight)* | 75 | 75 | 75 | 75 |
| | Acrylonitrile (% by weight)* | 10 | 8 | 8 | 10 |
| | Methyl methacrylate (% by weight)* | — | 2 | 2 | — |
| Step (a-2) (continuous feeding) | Acrylonitrile (% by weight)* | 10 | 10 | 10 | 10 |
| Step (a-3) (feeding batchwise) | Acrylonitrile (% by weight)* | 5 | 5 | 5 | 5 |
| Emulsifier | Use amount in Step (a-1) (phr: *based on 100% by weight)/ Use amount in step (a-2) (phr: *based on 100% by weight) | 2.5/1.0 | 2.5/1.0 | 1.5/0.5 | 3.5/1.5 |
| Polymerization conversion rate | % | 99.5 | 99.0 | 99.0 | 99.9 |
| Average particle diameter | Å | 350 | 450 | 800 | 250 |
| Weight-average molecular weight | g/mol | 250,000 | 250,000 | 200,000 | 250,000 |
| Glass transition temperature | ° C. | 142 | 140 | 140 | 140 | b) Shell Polymerization Step

Example 1

Based on 30 parts by weight of the latex S1 (based on solid) polymerized in (a) seed polymerization step 1, 150 parts by weight of deionized water, 45 parts by weight of α-methylstyrene, 10 parts by weight of acrylonitrile along with 0.5 parts by weight of lauric acid potassium, 0.2 parts by weight of alkenyl succinate potassium (product name: Latemul ASK), 0.3 parts by weight of n-dodecyl mercaptan, and 0.2 parts by weight of an α-methylstyrene dimer were fed to a nitrogen-substituted reactor batchwise and stirred at 50° C. for 30 minutes. Subsequently, an oxidation-reduction catalyst composed of 0.02 parts by weight of t-butyl hydroperoxide, 0.035 parts by weight of dextrose, 0.06 parts by weight of sodium pyrophosphate, and 0.0015 parts by weight of ferrous sulfate was added thereto batchwise and polymerization was carried out while elevating temperature to 70° C. for one hour. Here, a polymerization conversion rate was about 85%.

Subsequently, an emulsion composed of 100 parts by weight of deionized water, 10 parts by weight of α-methylstyrene, 3 parts by weight of acrylonitrile, and 0.3 parts by weight of lauric acid potassium was continuously fed thereto while elevating temperature to 75° C. for one hour. Here, a polymerization conversion rate was about 94%.

Next, 2 parts by weight of acrylonitrile along with an oxidation-reduction catalyst composed of 0.03 parts by weight of t-butyl hydroperoxide, 0.035 parts by weight of dextrose, 0.06 parts by weight of sodium pyrophosphate, and 0.0015 parts by weight of ferrous sulfate were fed thereto batchwise and additional polymerization was carried out for one hour.

A polymerization conversion rate of an obtained final product was about 99.5%, and the weight-average molecular weight thereof was 120,000 g/mol. An obtained latex was coagulated at 100 to 120° C. using 1 part by weight of $CaCl_2$, followed by drying at 160° C. for 30 minutes. The glass transition temperature of the dried sample was about 137° C.

Example 2

An experiment was carried out in the same manner as in Example 1, except that the initially added latex S1 was fed in an amount of 80 parts by weight (based on solid) and feeding was carried out in accordance with compositions summarized in Table 2 below.

Example 3

An experiment was carried out in the same manner as in Example 2, except that S2, as an initially fed latex, was used instead of S1 and feeding was carried out in accordance with compositions summarized in Table 2 below.

Comparative Example 1

An experiment was carried out in the same manner as in Example 1, except that S3, as an initially fed latex, was used instead of S1 and feeding was carried out in accordance with compositions summarized in Table 2 below.

Comparative Example 2

An experiment was carried out in the same manner as in Example 1, except that the mercaptan-based molecular weight controller was not included, the dimer-based molecular weight controller was used in an amount of 0.5 parts by weight, and feeding was carried out in accordance with compositions summarized in Table 2 below.

Comparative Example 3

An experiment was carried out in the same manner as in Example 1, except that the initially added latex S1 was not included and feeding was carried out in accordance with compositions summarized in Table 2 below.

In particular, an experiment was carried out in the same manner as in Example 1, except that 75 parts by weight of α-methylstyrene and 10 parts by weight of acrylonitrile were fed without addition of the seed and 1.5 parts by weight of fatty acid soap (fatty acid emulsifier) was fed in step (a-1), and a fatty acid emulsifier was included in an amount of 1.0 parts by weight based on 10 parts by weight of the acrylonitrile in step (a-2), and feeding was carried out as summarized in Table 2 below.

Comparative Example 4

An experiment was carried out in the same manner as in Example 1, except that S4, as an initially fed latex, was used instead of S1 and feeding was carried out in accordance with compositions summarized in Table 2 below.

Test Example

Properties of SAN resins obtained according to Examples 1 to 3 and Comparative Examples 1 to 4 were measured according to the following methods. Results are summarized in Table 2 below.

Measurement Methods

Coagulum (% by weight): A polymerized latex was filtered through a 200-mesh filter. Subsequently, coagulum on the filter was dried in an 80° C. oven to remove moisture therefrom. The amount of the moisture-removed coagulum was calculated as a percentage based on a total amount of a total of added monomers.

Glass transition temperature (Tg, ° C.): A powder obtained through coagulation was dried for 30 minutes in a 165° C. oven. The glass transition temperature of a dried product was measured at a temperature elevation rate of 10° C./min by means of a DSC device.

TABLE 2

| | | Examples | | | Comparative Examples | | | |
|---|---|---|---|---|---|---|---|---|
| Classification | | 1 | 2 | 3 | 1 | 2 | 3 | 4 |
| Step (b-1) (feeding batchwise) | Seed (% by weight)* | 30 (S1) | 80 (S1) | 80 (S2) | 30 (S3) | 30 (S3) | — | 30 (S4) |
| | α-methylstyrene (% by weight)* | 45 | 7 | 7 | 45 | 45 | 75 | 45 |
| | acrylonitrile (% by weight)* | 10 | 3 | 3 | 10 | 10 | 10 | 10 |

TABLE 2-continued

| Classification | | Examples | | | Comparative Examples | | | |
|---|---|---|---|---|---|---|---|---|
| | | 1 | 2 | 3 | 1 | 2 | 3 | 4 |
| Step (b-2) (continuous feeding) | α-methylstyrene (% by weight)* | 10 | 3 | 3 | 10 | 10 | 10 | 10 |
| | acrylonitrile (% by weight)* | 3 | 5 | 5 | 3 | 3 | — | 3 |
| Step (b-3) (feeding batchwise) | acrylonitrile (% by weight)* | 2 | 2 | 2 | 2 | 2 | 5 | 2 |
| Mercaptan-based molecular weight controller | Phr (*based on 100% by weight) | 0.3 | 0.3 | 0.3 | 0.3 | — | 0.2 | 0.3 |
| Dimer-based molecular weight controller | Phr (*based on 100% by weight) | 0.2 | 0.2 | 0.2 | 0.2 | 0.5 | — | 0.2 |
| Polymerization conversion rate | % | 99.5 | 99.2 | 98.7 | 95.2 | 94.3 | 96.5 | 99.7 |
| Coagulum | % by weight | 0.014 | 0.012 | 0.018 | 0.320 | 0.470 | 0.270 | 0.01 |
| Reaction time | Hr | 3.0 | 3.0 | 3.0 | 6.0 | 8.0 | 12.0 | 3.0 |
| Weight-average molecular weight | g/mol | 120,000 | 140,000 | 130,000 | 80,000 | 100,000 | 220,000 | 130,000 |
| Glass transition temperature | °C. | 137 | 142 | 140 | 132 | 118 | 135 | 135 |

As shown in Table 2, it can be confirmed that, in the cases of Examples 1 to 3 in which the two-step polymerization according to the present invention was carried out, a high polymerization conversion rate, stable polymerization, and high glass transition temperature are provided within a short time, compared to Comparative Example 3, in which the two-step polymerization was not carried out, or Comparative Examples 1 and 2, in which the two-step polymerization was carried out, but the seed (S3) having an improper particle diameter range was used. In addition, it can be confirmed that, in the case of Comparative Example 4 in which the seed (S4) having a very small particle size was used, a glass transition temperature is somewhat decreased.

[Coagulation Test]

In addition, cohesion of the heat-resistant SAN resins according to Examples 1 to 3 and Comparative Examples 1 to 4 was measured in accordance with the following methods. Results are summarized in Table 3 below.

Measurement Methods

Moisture content (%): Complete drying was carried out at 150° C. by means of a moisture meter (METTLER/TOLEDO HR83-P) and then weight change was measured.

Content of fine particles (% by weight): Particle diameters were measured by means of a standard screen (No. 200 mesh) and the amount of particles passing through a 200-mesh screen was represented as a percentage.

TABLE 3

| Cohesion | Examples | | | Comparative Examples | | | |
|---|---|---|---|---|---|---|---|
| | 1 | 2 | 3 | 1 | 2 | 3 | 4 |
| Moisture content (%) | 27 | 30 | 32 | 28 | 25 | 75 | 45 |
| Content of fine particles (% by weight) | 10 | 18 | 15 | 5 | 2 | 32 | 20 |

As shown in Table 3, it can be confirmed that, in the cases of Examples 1 to 3 in which the two-step polymerization according to the present invention was carried out, a moisture content and a fine particle content are enhanced, compared to Comparative Example 3, in which the two-step polymerization was not carried out, or Comparative Examples 1 and 2, in which the two-step polymerization was carried out, but the seed (S3) having an improper particle diameter range was used. In addition, it can be confirmed that, in the case of Comparative Example 4 in which the seed (S4) with a very small particle dimer was used, cohesion is decreased in the presence of the coagulant at the same content due to addition of a large amount of the emulsifier. Accordingly, it can be confirmed that moisture content enhancement effects are slight and the content of fine particles is increased.

Preparation Examples 1 to 3 and Comparative Preparation Examples 1 to 4

75 parts by weight of the SAN resin obtained according to each of Examples 1 to 3 and Comparative Examples 1 to 4 was added to 27.5 parts by weight of an ABS dry powder containing 60% by weight of rubber, and 1 part by weight of internal lubricant and 0.1 parts by weight of thermal stabilizer were mixed therewith, followed by extruding at 230° C. An obtained pellet was subjected to an injection process to manufacture a specimen for measuring properties.

Properties of each specimen were measured according to the following heat-resistant ABS evaluation standards. Results are summarized in Table 4 below.

Measurement Methods

IMP (Izod impact strength, ¼"): Measured using specimens with a thickness of ¼" in accordance with ASTM D256.

MI (melt index, g/10 min): Measured under conditions of 220° C. and a load of 10 kg in accordance with ASTM D1238.

HDT (heat deflection temperature, ° C.): Measured in accordance with ASTM D648.

TABLE 4

| Properties of heat-resistant ABS | Preparation Examples | | | Comparative Preparation Examples | | | |
|---|---|---|---|---|---|---|---|
| | 1 | 2 | 3 | 1 | 2 | 3 | 4 |
| IMP (¼") | 17 | 18 | 17 | 14 | 15 | 18 | 16 |
| MI (g/10 min) | 4.0 | 3.5 | 3.7 | 4.5 | 4.3 | 2.5 | 4.5 |
| HDT (° C.) | 105 | 108 | 106 | 97 | 95 | 100 | 102 |

As shown in Table 4, it can be confirmed that, in the cases of Preparation Examples 1 to 3 in which the SAN resins of Examples 1 to 3 according to the present invention were used, impact strength (IMP), melt index (MI), and heat deflection temperature (HDT) are enhanced within a short time, compared to Comparative Preparation Example 3 in which the SAN resin of Comparative Example 3, in which the two-step polymerization was not performed, was used, or Comparative Preparation Examples 1 and 2 in which the SAN resins of Comparative Examples 1 and 2, in which the two-step polymerization was carried out, but the seed (S3) with an improper particle diameter range was used, were used. In addition, it can be confirmed that, in the case of Comparative Preparation Example 4 in which the SAN resin of Comparative Example 4, in which the seed (S4) with a very small particle diameter was used, was used, a remaining low-molecular-weight material is included in a large amount, thus decreasing impact strength and heat deflection temperature (HDT).

Such results may be analogized as being caused by limiting new particle formation through application of seed particles to polymerization, thus minimizing the content of impurities, and, at the same time, by adding a polymerization step so as to partially enhance cohesion of one step polymerization and thus minimizing a glass transition temperature decrement.

The invention claimed is:

1. A method of preparing a resin, the method comprising:
   polymerizing a vinylcyan compound-based first part comprising 70 to 80 parts by weight of a first monomer and 30 to 20 parts by weight of a vinylcyan compound monomer and having a glass transition temperature of 140° C. or more, a number average particle diameter of 300 to 700 Å, and a weight-average molecular weight of 200,000 to 300,000 g/mol; and
   polymerizing a vinylcyan compound-based second part, the second part enveloping the first part comprising the first monomer and the vinylcyan compound monomer, wherein the resin comprises 30 to 80 parts by weight of the first part and 70 to 20 parts by weight of the second part, and has a glass transition temperature of 135 to 145° C. and a weight-average molecular weight of 100,000 to 150,000 g/mol.

2. The method according to claim 1, wherein a total time taken for the polymerizing of the vinylcyan compound-based first part and the polymerizing of the vinylcyan compound-based second part is four hours or less, and a polymerization conversion rate of each of the polymerizing of the vinylcyan compound-based first part and the polymerizing of the vinylcyan compound-based second part is 98.5% or more.

3. The method according to claim 1, wherein, in the 20 to 30 parts by weight of the vinylcyan compound monomer of the polymerizing of the first part, at least one selected from a (meth)acrylic acid alkyl ester monomer and an aromatic vinyl compound monomer (except for α-methylstyrene) is comprised in an amount of 2 to 5 parts by weight.

4. The method according to claim 1, wherein the polymerizing of the vinylcyan compound-based first part comprises:
   emulsion-polymerizing by feeding 70 to 80 parts by weight of the first monomer batchwise, 8 to 10 parts by weight of the vinylcyan compound monomer, and 0 to 2 parts by weight of at least one selected from a (meth)acrylic acid alkyl ester monomer and an aromatic vinyl compound monomer (except for α-methylstyrene), in a presence of a $C_{12}$ to $C_{18}$ saturated hydrocarbon-based emulsifier;
   emulsion-polymerizing by continuously feeding 5 to 15 parts by weight of the vinylcyan compound monomer in a presence of the $C_{12}$ to $C_{18}$ saturated hydrocarbon-based emulsifier when a polymerization conversion rate is 83 to 88%; and
   polymerizing by feeding 2 to 8 parts by weight of the vinylcyan compound monomer batchwise when a polymerization conversion rate is 92 to 96%.

5. The method according to claim 4, wherein the emulsifier of the emulsion-polymerizing by feeding 70 to 80 parts by weight of the first monomer is comprised in an amount of 1.4 to 2.9 parts by weight based on 100 parts by weight of a total of the monomers of the polymerizing of the vinylcyan compound-based first part, and the emulsifier of the emulsion-polymerizing by continuously feeding 5 to 15 parts by weight of the vinylcyan compound monomer is comprised such that a total amount of this emulsifier and the emulsifier of the emulsion-polymerizing by feeding 70 to 80 parts by weight of the first monomer is 2.1 to 4.0 parts by weight.

6. The method according to claim 1, wherein, in the polymerizing of the vinylcyan compound-based second part, the first monomer is comprised in an amount of 5 to 60 parts by weight, based on 100 parts by weight of the first part and a total of the monomers.

7. The method according to claim 1, wherein, in the polymerizing of the vinylcyan compound-based second part, the vinylcyan compound monomer is comprised in an amount of 5 to 20 parts by weight based on 100 parts by weight of the first part and a total of the monomers.

8. The method according to claim 7, wherein, in 5 to 20 parts by weight of the vinylcyan compound monomer, at least one selected from a (meth)acrylic acid alkyl ester monomer and an aromatic vinyl compound monomer (except for α-methylstyrene) is comprised in an amount of 1 to 5 parts by weight.

9. The method according to claim 1, wherein the polymerizing of the second part comprises:
  emulsion-polymerizing by feeding 30 to 80 parts by weight of the first part, 7 to 45 parts by weight of the first monomer, 3 to 10 parts by weight of the vinylcyan compound monomer, and 0 to 2 parts by weight of at least one selected from a (meth)acrylic acid alkyl ester and an aromatic vinyl compound (except for α-methylstyrene) to a mixture that comprises an emulsifier mixture comprising a $C_{12}$ to $C_{18}$ saturated hydrocarbon-based emulsifier and a monomer-type or polymer-type emulsifier with an unsaturated double bond, and a molecular weight controller mixture comprising a mercaptan-based $C_6$ to $C_{12}$ molecular weight controller and a dimer-based molecular weight controller;
  emulsion-polymerizing by continuously feeding 3 to 10 parts by weight of the first monomer and 3 to 5 parts by weight of the vinylcyan compound monomer in a presence of a $C_{12}$ to $C_{18}$ saturated hydrocarbon-based emulsifier when a polymerization conversion rate is 83 to 88%; and
  polymerizing by adding 1 to 5 parts by weight of the vinylcyan compound monomer batchwise when a polymerization conversion rate is 92 to 96%.

10. The method according to claim 9, wherein, in the emulsion-polymerizing by feeding 30 to 80 parts by weight of the first part, the mercaptan-based $C_6$ to $C_{12}$ molecular weight controller and the dimer-based molecular weight controller are mixed in a ratio of 50:50 to 90:10 and comprised in an amount of 0.2 to 0.5 parts by weight based on 100 parts by weight of the first part and a total of the monomers.

11. The method according to claim 9, wherein, in the emulsion-polymerizing by feeding 30 to 80 parts by weight of the first part, the $C_{12}$ to $C_{18}$ saturated hydrocarbon-based emulsifier and the low molecular weight emulsifier with an unsaturated double bond are mixed in a weight ratio of 50:50 to 90:10 and comprised in an amount of 0.5 to 1.0 parts by weight based on 100 parts by weight of the first part and a total of the monomers of the polymerizing of the vinylcyan compound-based second part.

12. The method according to claim 9, wherein, in the emulsion polymerizing by continuously feeding 3 to 10 parts by weight of the first monomer, the $C_{12}$ to $C_{18}$ saturated hydrocarbon-based emulsifier is comprised in an amount of 0.2 to 0.5 parts by weight, based on 100 parts by weight of the first part and a total of the monomers of the polymerizing of the vinylcyan compound-based second part.

13. The method according to claim 1, wherein, in the polymerizing of the vinylcyan compound-based second part, an amount of coagulum is 0.03% by weight or less.

14. A SAN resin, comprising:
  a vinylcyan compound-based first part comprising 70 to 80 parts by weight of a first monomer and 30 to 20 parts by weight of a vinylcyan compound monomer and having a glass transition temperature of 140° C. or more, an average particle diameter of 300 to 700 Å, and a weight-average molecular weight of 200,000 to 300,000 g/mol; and
  a second part enveloping the first part comprising the monomer and the vinylcyan compound monomer,
  wherein the resin comprises 30 to 80 parts by weight of the first part and 70 to 20 parts by weight of the first part, and has a glass transition temperature of 135 to 145° C. and a weight-average molecular weight of 100,000 to 150,000 g/mol.

15. The SAN resin according to claim 14, wherein the resin has a weight-average molecular weight of 100,000 to 150,000 g/mol and a glass transition temperature of 135 to 145° C.

16. An ABS resin composition, wherein the ABS resin composition comprises the SAN resin according to claim 14 and an ABS resin and has a heat deflection temperature (HDT) of greater than 100° C. and a melt index (MI) of 3.5 to 4.0 g/10 min at 220° C. with a 10 kg load according to ASTM D1238.

17. The resin of claim 1, wherein the monomer is α-methylstyrene.

* * * * *